(12) United States Patent
Xu et al.

(10) Patent No.: US 11,837,885 B2
(45) Date of Patent: Dec. 5, 2023

(54) COIL MODULE, POWER TRANSMITTING CIRCUIT AND POWER RECEIVING CIRCUIT

(71) Applicant: NINGBO WEIE ELECTRONICS TECHNOLOGY LTD., Ningbo (CN)

(72) Inventors: Lizhi Xu, Ningbo (CN); Weiyi Feng, Ningbo (CN); Feng Yu, Ningbo (CN)

(73) Assignee: Ningbo Weie Electronics Technology Ltd., Ningbo (CN)

( * ) Notice: Subject to any disclaimer, the term of this patent is extended or adjusted under 35 U.S.C. 154(b) by 0 days.

(21) Appl. No.: 17/461,104

(22) Filed: Aug. 30, 2021

(65) Prior Publication Data

US 2022/0077720 A1    Mar. 10, 2022

(30) Foreign Application Priority Data

Sep. 9, 2020 (CN) .......................... 202010943570.X (51) Int. Cl.
| | |
|---|---|
| H02J 50/70 | (2016.01) |
| H02J 50/12 | (2016.01) |
| H02J 50/40 | (2016.01) |
| H01F 27/28 | (2006.01) |
| H01F 27/36 | (2006.01) |
| H01F 38/14 | (2006.01) |

(52) U.S. Cl.
CPC .......... *H02J 50/70* (2016.02); *H01F 27/2871* (2013.01); *H01F 27/36* (2013.01); *H01F 38/14* (2013.01); *H02J 50/12* (2016.02); *H02J 50/402* (2020.01)

(58) Field of Classification Search
CPC ....................................................... H02J 50/12
See application file for complete search history.

(56) References Cited

U.S. PATENT DOCUMENTS

| | | | |
|---|---|---|---|
| 2012/0010079 A1* | 1/2012 | Sedwick | H03B 15/003 307/104 |
| 2014/0285299 A1* | 9/2014 | Bojer | H03H 5/003 336/105 |
| 2021/0044154 A1* | 2/2021 | Sherman | H01F 38/14 |

FOREIGN PATENT DOCUMENTS

| | | |
|---|---|---|
| CN | 207925287 U | 9/2018 |
| CN | 209591776 U | 11/2019 |
| CN | 213661277 U | 7/2021 |

* cited by examiner

*Primary Examiner* — Daniel Kessie
(74) *Attorney, Agent, or Firm* — Andrus Intellectual Property Law, LLP (57) ABSTRACT

A coil module, power transmitting circuit and power receiving circuit are disclosed. The coil module including at least two parallel branches, wherein each parallel branch includes a coil and a first capacitor which are connected in series; the capacitances of the first capacitors are set to reduce or eliminate an equivalent impedance difference between the parallel branches. Therefore, the loss is reduced and the wireless charging efficiency is improved while ensuring the charging rate and the charging degree of freedom.

12 Claims, 6 Drawing Sheets

Fig.1

Related Art

Fig.2

Related Art

Fig.3

Related Art

Fig.4

Related Art

COIL MODULE, POWER TRANSMITTING CIRCUIT AND POWER RECEIVING CIRCUIT

CLAIM OF PRIORITY AND CROSS-REFERENCE TO RELATED APPLICATION(S)

This application claims the benefit of Chinese Patent Application No. 202010943570.X, filed on Sep. 9, 2020, which is incorporated herein by reference in its entirety.

BACKGROUND OF THE INVENTION

1. Field of the Invention

The present invention relates to the field of wireless charging, and particularly to a coil module, power transmitting circuit and power receiving circuit.

2. Description of the Related Art

Wirelessly charged mobile terminals are increasingly popularized; the mobile terminals are mostly configured with a wireless charging function; a user has higher and higher requirements for wireless charging rate and degree of charging freedom; therefore, a power transmitting coil in a wireless charger needs to excite a stronger magnetic field with a larger current. In order to reduce the loss of the coil, a thicker winding wire is adopted in the prior art. However, the thicker non-standard wire would improve the cost. Furthermore, due to the skin effect and proximity effect of a high frequency current, when the wire diameter of the winding wire increases to a certain extent, the loss would not be reduced.

BRIEF DESCRIPTION OF THE INVENTION

According to one aspect of the present disclosure, the present disclosure provides a coil module, the coil module comprises at least two parallel branches, wherein each parallel branch comprises a coil and a first capacitor which are connected in series; wherein the capacitances of the first capacitors are set to reduce or eliminate an equivalent impedance difference between the parallel branches.

According to another aspect of the present disclosure, the present disclosure provides a power transmitting circuit, used for transmitting power in a wireless manner, wherein the power transmitting circuit comprises a coil module; wherein the coil module comprises at least two parallel branches, wherein each parallel branch comprises a coil and a first capacitor which are connected in series; wherein the capacitances of the first capacitors are set to reduce or eliminate an equivalent impedance difference between the parallel branches.

According to another aspect of the present disclosure, the present disclosure provides a power receiving circuit, used for receiving power in a wireless manner, wherein the power receiving circuit comprises a coil module; wherein the coil module comprises at least two parallel branches, wherein each parallel branch comprises a coil and a first capacitor which are connected in series; wherein the capacitances of the first capacitors are set to reduce or eliminate an equivalent impedance difference between the parallel branches.

In accordance with the abovementioned coil module, power transmitting circuit or power receiving circuit, during charging in a wireless manner, the loss can be reduced and the wireless charging efficiency can be improved while ensuring the charging rate and the degree of charging freedom.

BRIEF DESCRIPTION OF THE DRAWINGS

Through the following description of the embodiments of the present invention with reference to the drawings, the above and other objectives, features, and advantages of the present invention will become more apparent, wherein.

DETAILED DESCRIPTION OF EMBODIMENTS OF THE INVENTION

Several preferred embodiments of the present disclosure will be described in detail in conjunction with the accompanying drawings as follows, however, the present disclosure is intended to encompass any substitutions, modifications, equivalents, etc., made thereto without departing from the spirit and scope of the present disclosure. In order to provide those skilled in the art with thorough understanding of the present disclosure, particular details will be described below in the preferred embodiments of the present disclosure, although those skilled in the art can understand the present disclosure without the description of these details.

In addition, a person skilled in the art should understand that the drawings herein are provided for the purpose of description only, and are not necessarily drawn in proportion.

Furthermore, it should be understood that in the following descriptions, "circuit" refers to an electrical circuit formed by electrically connecting or electromagnetically connecting at least one element or sub-circuit. When one element or circuit is "connected to" another element or one element/circuit is "connected" between two nodes, the one element/circuit can be directly coupled or connected to another element or via an intermediate element, and the connection between the elements can be a physical connection, a logical connection, or a combination thereof. On the contrary, when one element is "directly coupled to" or "directly connected to" another element, it means that no intermediate element is provided between the two elements.

Unless otherwise stated, the terms "comprise", "include" and the like in the specification shall be interpreted as inclusive rather than exclusive or exhaustive; in other words, the terms mean "include but not limited to".

In the descriptions of the present invention, it should be understood that the terms like "first", "second" and the like are used for the purpose of description only, but cannot be considered to indicate or imply relative importance. In addition, in the descriptions of the present invention, unless otherwise stated, the meaning of "a plurality of" is two or more.

In the related art, the wire diameter of the winding wire can be equivalently increased by connecting two or more standard wires in parallel. For example, two winding wires are wound in parallel in a direction parallel to a bottom magnetic sheet, or two winding wires are wound in parallel in a direction perpendicular to the bottom magnetic sheet, so as to improve the current capacity of the coil module and reduce loss.

Figure 1:
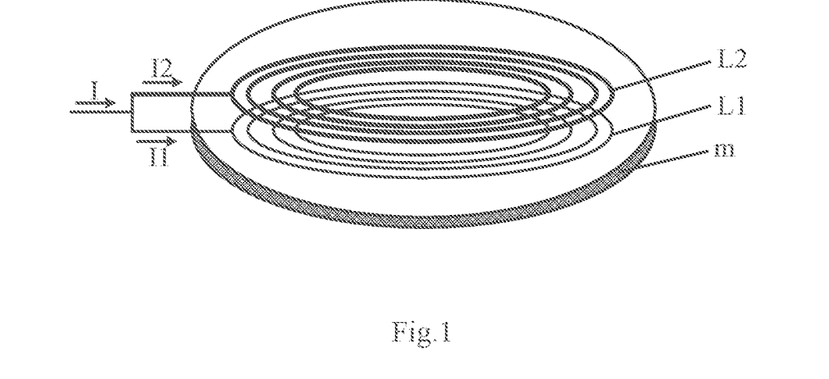
FIG. 1 is a schematic view of a coil module in the related art.

FIG. 1 is a schematic view of a coil module in the related art. As shown in FIG. 1, a winding wire L1 and a winding wire L2 are electrically connected in parallel, while the winding wire L1 and the winding wire L2 are respectively wound in two planes parallel to a corresponding magnetic sheet m, wherein the two planes are non-coplanar. When a power-on current is I, a current passing through the winding wire L1 is I1, and a current passing through the winding wire L2 is I2. In such coil module, the winding wire L1 is closer to the magnetic sheet m than the winding wire L2; therefore, the inductance of the winding wire L1 is greater than that of the winding wire L2, resulting in the inconsistence of the impedance of the winding wire L1 and that of the winding wire L2. Due to the impedance difference between the winding wire L1 and the winding wire L2, when a high frequency alternating current I passes through the winding wires connected in parallel, the current I1 on the winding wire L1 is not equal to the current I2 on the winding wire L2 (that is, I1≠I2≠I/2); therefore, such mode obviously cannot effectively reduce loss.

Figure 2:
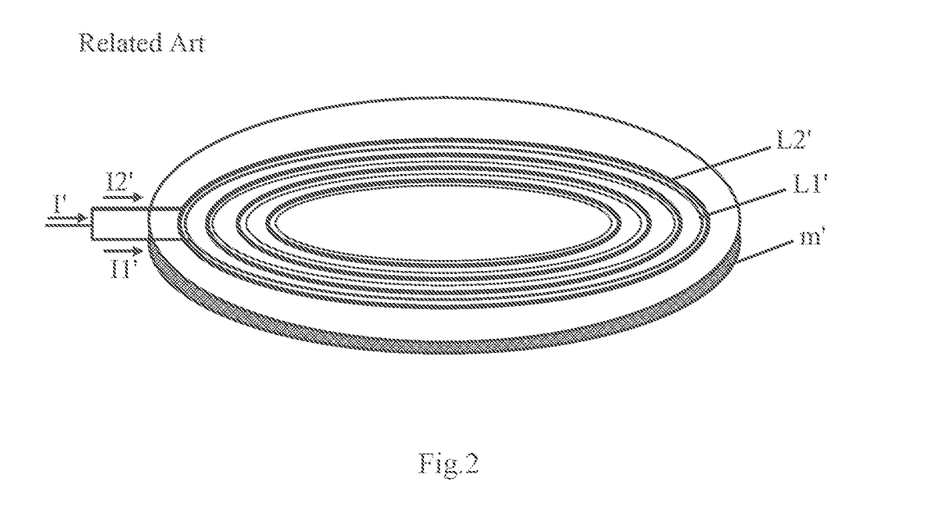
FIG. 2 is a schematic view of another coil module in the related art.

FIG. 2 is a schematic view of another coil module in the related art, As shown in FIG. 2, a winding wire L1' and a winding wire L2' are wound in parallel in a direction parallel to a magnetic sheet m'; when a power-on current is I', a current passing through the winding wire L1' is I1', and a current passing through the winding wire L2' is I2'. In such coil module, the positions of the winding wire L1' and the winding wire L2' are not completely symmetric; therefore, the inductance of the winding wire L1' is different from that of the winding wire L2', resulting in the inconsistence of the impedance of the winding wire L1' and that of the winding wire L2'. Due to the impedance difference between the winding wire L1' and the winding wire L2', when a high frequency alternating current I' passes through the winding wires connected in parallel, the current I1' on the winding wire L1' is not equal to the current I2' on the winding wire L2'; therefore, such mode cannot effectively reduce loss either.

Figure 3:
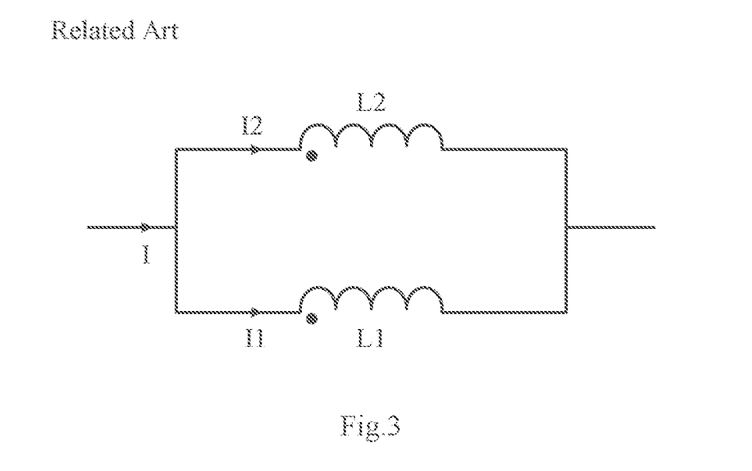
FIG. 3 is a schematic view of a circuit model in the related art.
Figure 4:
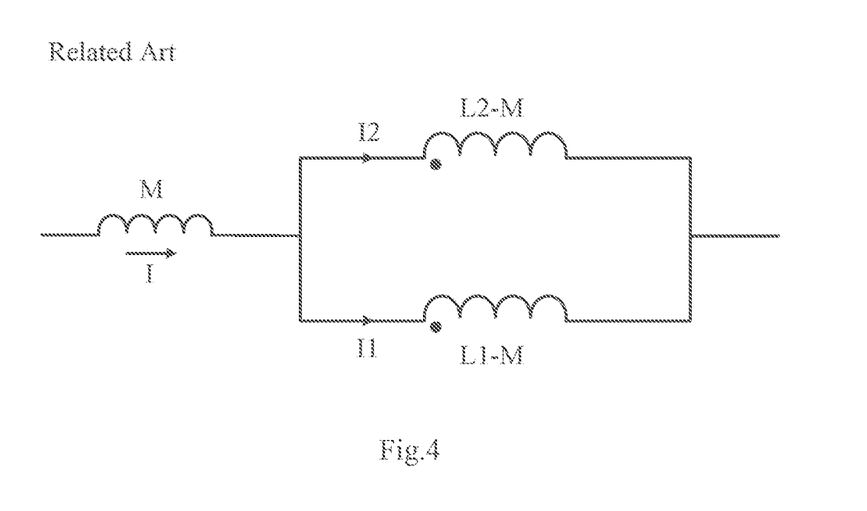
FIG. 4 is a schematic view of an equivalent circuit in the related art.

FIG. 3 is a schematic view of a circuit model in the related art. FIG. 4 is a schematic view of an equivalent circuit in the related art. The related art as show in FIG. 1 is illustrated as an example below, and its circuit model and equivalent circuit are as shown in FIGS. 3 and 4. Assuming that a coupling coefficient is k, a coupling inductance M between an upper winding wire L2 and a lower winding wire L1 can be calculated by the following formula:

$$M=k\sqrt{L_1 \times L_2}$$

Then an equivalent inductance corresponding to the upper winding wire L2 is (L2−M), and an equivalent inductance corresponding to the lower winding wire L1 is (L1−M). An inductance difference between the winding wire L2 and the winding wire L1 can be denoted as: (L2−M):(L1−M); and a ratio of the current I2 passing through the winding wire L2 to the current I1 passing through the winding wire L1 is (L1−M):(L2−M). For example, assuming that the inductance of the winding wire L2 is 28 uH, the inductance of the winding wire L1 is 31 uH, and the coupling coefficient between the winding wire L1 and the winding wire L2 is k=0.9, then the coupling inductance between the winding wire L1 and the winding wire L2 is:

$$M=k\sqrt{L_1 \times L_2}=0.9\times\sqrt{28\times31}\approx 26.5 \text{ uH}$$

wherein $L_1$ is the inductance of the winding wire L1, $L_2$ is the inductance of the winding wire L2. The equivalent inductance of the winding wire L1 is L1−M=31 uH−26.5 uH=4.5 uH, and the equivalent inductance of the winding wire L2 is L2−M=28 uH−26.5 uH=1.5 uH. Therefore, the inductance difference between the winding wire L1 and the winding wire L2 is 3:1; correspondingly, after power-on, the current I1 passing through the winding wire L1 is ⅓ of the current I2 passing through the winding wire L2. Therefore, it can be seen that a tiny inductance difference would result in a huge current difference, and the loss is still large.

Figure 5:
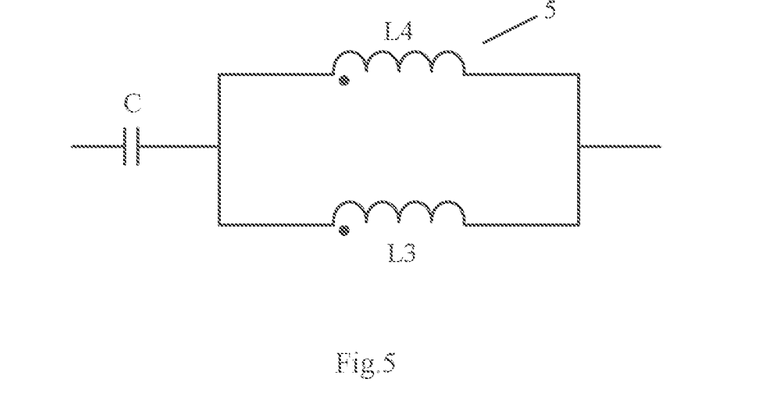
FIG. 5 is a schematic view of another circuit model in the related art.

FIG. 5 is a schematic view of another circuit model in the related art. In the related art, in order to compensate the inductance of the power transmitting coil, a resonant capacitor is generally connected to the power transmitting coil in series. As shown in FIG. 5, in the circuit model 5, the power transmitting coils L3 and L4 are connected in parallel and then resonate with a capacitor C, so as to improve the power transmitting efficiency. However, such connection mode still cannot eliminate the inductance difference between the branch in which the coil L3 is located and the branch in which the coil L4 is located; the current distribution of the two branches is nonuniform, and the loss is still large.

Therefore, an embodiment of the present disclosure provides a coil module, including at least two parallel branches, wherein each parallel branch includes a coil and a first capacitor which are connected in series. The capacitance of each first capacitor is set to reduce or eliminate an inductance difference between the coils, so as to keep the currents in the coils basically equal after power-on. Therefore, while ensuring the charging rate and the degree of charging freedom, the loss is effectively reduced and the wireless charging efficiency is improved.

In one optional embodiment, the coils in the parallel branches of the coil module are respectively wound in planes parallel to a corresponding magnetic sheet, wherein the planes do not coincide with each other. That is, the coils are arranged in a direction perpendicular to the corresponding magnetic sheet. The coils in the parallel branches of the coil module are in parallel. Optionally, the coils in the coil module are concentrically placed. Optionally, the coils in the coil module have the same number of turns.

Figure 6:
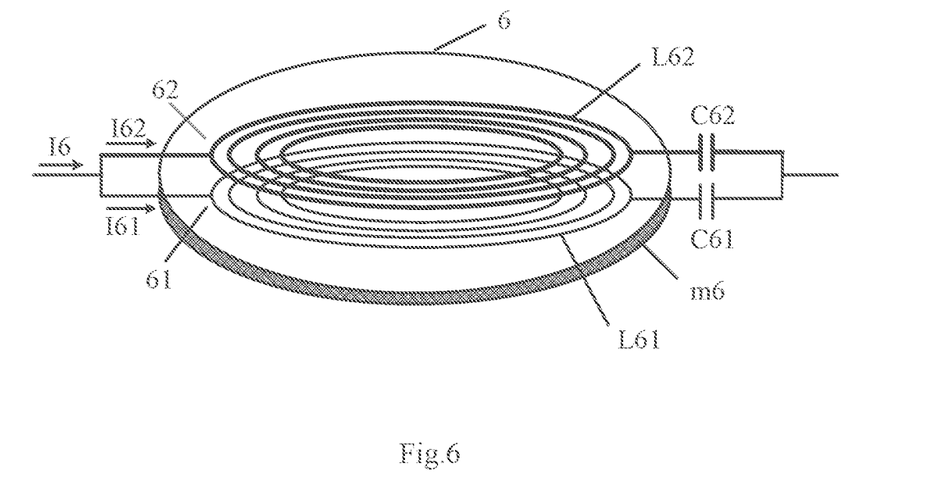
FIG. 6 is a schematic view of a coil module according to one embodiment of the present disclosure.
Figure 7:
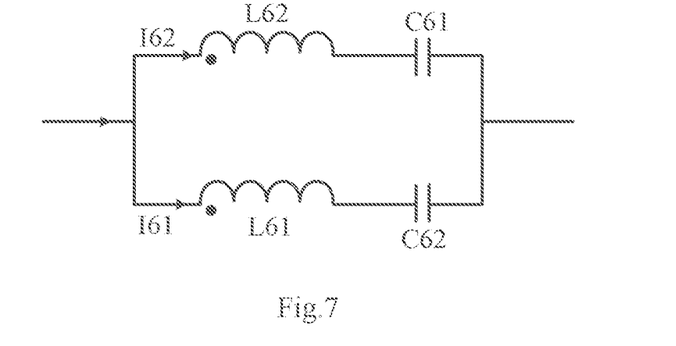
FIG. 7 is a schematic view of a circuit model of the coil module according to one embodiment of the present disclosure.
Figure 8:
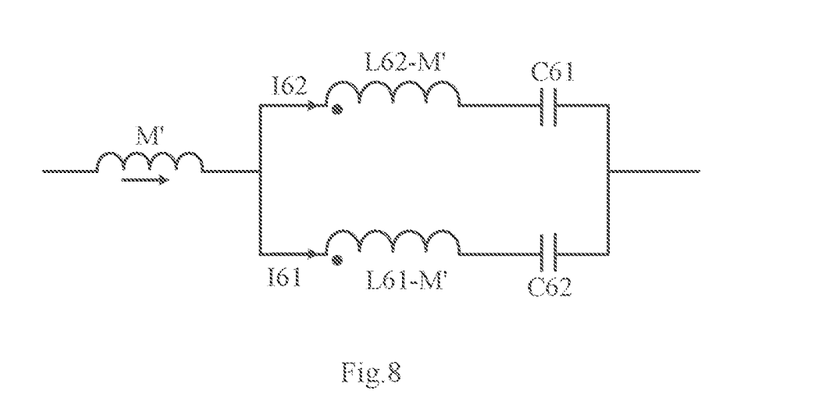
FIG. 8 is a schematic view of an equivalent circuit of the coil module according to one embodiment of the present disclosure.

FIG. 6 is a schematic view of the coil module according to one embodiment of the present disclosure. FIG. 7 is a schematic view of the circuit model of the coil module according to one embodiment of the present disclosure. FIG. 8 is a schematic view of the equivalent circuit of the coil module according to one embodiment of the present disclosure. The present embodiment is described by taking the following configurations as an example: the coil module includes two parallel branches, and the coils are concentrically disposed and have the same number of turns. It should be understood that the number of the parallel branches in the coil module, the positions of the coils, and the number of turns of the coils can be configured according to requirements for a specific application scenario, and are not limited by the present embodiment. As shown in FIG. 6, the coil module 6 includes a parallel branch 61 and a parallel branch 62, wherein the parallel branch 61 includes a coil L61 and a capacitor C61 which are connected in series; the parallel branch 62 includes a coil L62 and a capacitor C62 which are connected in series. The coil 61 and the coil 62 are in parallel. The coil 61 and the coil 62 are respectively wound in two planes parallel to a corresponding magnetic sheet m6, wherein the two planes are non-coplanar. That is, the coil 61 and the coil 62 are arranged in a direction perpendicular to the magnetic sheet m6. The coil 61 and the coil 62 are concentrically disposed, and have the same number of turns. The distance between the coil L61 and the magnetic sheet M6 is closer than the distance between the coil L62 and the magnetic sheet M6. The coil L61 resonates with the capacitor C61, and the coil L62 resonates with the capacitor C62, so as to generate an electromagnetic field for wireless charging. In the present embodiment, the capacitances of the capacitor C61 and the capacitor C62 are set to reduce or eliminate an equivalent impedance difference between the branch 61 and the branch 62, so as to reduce or eliminate a difference between the current I61 passing through the branch 61 and the current I62 passing through the branch 62. Therefore, while ensuring the charging rate and the degree of charging freedom, the loss is effectively reduced and the wireless charging efficiency is improved.

As shown in FIGS. 7 and 8, in the present embodiment, the equivalent impedance Z1 on the parallel branch L61 is:

$$Z1 = \left| j\omega(L61 - M') + \frac{1}{j\omega C61} \right|$$

The equivalent impedance Z2 on the parallel branch L62 is:

$$Z2 = \left| j\omega(L62 - M') + \frac{1}{j\omega C62} \right|$$

Wherein M' is the coupling inductance between the coil L61 and the coil L62 when the coupling coefficient is k.

Assuming that the inductance of the coil L61 adjacent to the magnetic sheet m6 is 31 uH, the inductance of the coil L62 distal from the magnetic sheet m6 is 28 uH, and the coupling coefficient k is 0.9, then the coupling inductance M' between the coil L61 and the coil L62 is:

$$M' = k\sqrt{L_1 \times L_2} = 0.9 \times \sqrt{28 \times 31} \approx 26.5 \text{ uH}$$

Wherein $L_1$ is the inductance of the winding wire L61, $L_2$ is the inductance of the winding wire L62.

In one optional embodiment, the capacitors in the parallel branches have the same capacitance. If the capacitance of the capacitor C61 and the capacitance of the capacitor C62 are both set as 60 nF, and the frequency of the high frequency current is 100 kHz, that is, $\omega = 2\pi \ast 100$ k, then the equivalent impedance Z1 on the parallel branch L61 is:

$$Z1 = \left| j\omega(L61 - M') + \frac{1}{j\omega C61} \right| = |2.8j - 26j| = 23.2$$

The equivalent impedance Z2 on the parallel branch L62 is:

$$Z2 = \left| j\omega(L62 - M') + \frac{1}{j\omega C62} \right| = |0.9j - 26j| = 25.1$$

Therefore, in the impedance of each parallel branches, the capacitive reactance of the capacitor occupies a dominant position, such that the equivalent impedance Z1 on the parallel branch L61 is basically consistent with the equivalent impedance Z2 on the parallel branch L62, wherein the ratio of the equivalent impedance Z1 on the parallel branch L61 to the equivalent impedance Z2 on the parallel branch L62 is 25.1:23.2≈1.08:1. Therefore, the ratio of the current I61 passing through the parallel branch 61 to the current I62 passing through the parallel branch 62 is 1:1.08, that is, the current can be basically uniformly distributed on the parallel branches, thereby the loss is reduced and the wireless charging efficiency is improved.

In another optional embodiment, the first capacitors are configured to have capacitances that causing the equality of equivalent impedances of the parallel branches, such that the current can be uniformly distributed or basically uniformly distributed on the parallel coils, that is, the currents in the parallel coils are equal or basically equal. Taking the above embodiment as an example, assuming that the capacitance of the capacitor C61 is 57 nF and the capacitance of the capacitor C62 is 60 nF, then the equivalent impedance Z1 on the parallel branch L61 is:

$$Z1 = \left| j\omega(L61 - M') + \frac{1}{j\omega C61} \right| = |2.8j - 26j| = 25.1$$

The equivalent impedance Z2 on the parallel branch L62 is:

$$Z2 = \left| j\omega(L62 - M') + \frac{1}{j\omega C62} \right| = |0.9j - 26j| = 25.1$$

Therefore, the ratio of the equivalent impedance Z1 on the parallel branch L61 to the equivalent impedance Z2 on the parallel branch L62 is 1:1. Thus, the ratio of the current I61 passing through the parallel branch 61 to the current I62 passing through the parallel branch 62 is 1:1, that is, the current can be uniformly distributed on the parallel branches, thereby the loss is reduced and the wireless charging efficiency is improved.

In the present embodiment, a resonant capacitor with a corresponding capacitance is configured for the coil on each parallel branch to reduce or eliminate the equivalent impedance difference between the parallel branches, so as to reduce or eliminate the current difference between the parallel branches. The loss is reduced and the wireless charging efficiency is improved, while ensuring the charging rate and the degree of charging freedom.

Figure 9:
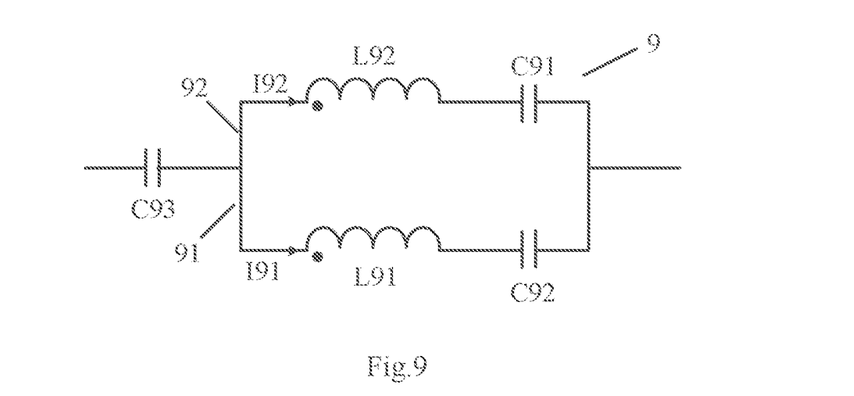
FIG. 9 is a schematic view of a circuit model of the coil module according to another embodiment of the present disclosure.

FIG. 9 is a schematic view of the circuit model of the coil module according to another embodiment of the present disclosure. As shown in FIG. 9, the coil module 9 in the present embodiment includes a parallel branch 91, a parallel branch 92, and a second capacitor C93 connected to the parallel branches in series, wherein the parallel branch 91 includes a coil L91 and a capacitor C91 which are connected in series; the parallel branch 92 includes a coil L92 and a capacitor C92 which are connected in series. The coil 91 and the coil 92 are in parallel. The coil 91 and the coil 92 are respectively wound in two planes parallel to a corresponding magnetic sheet m6, wherein the two planes are non-coplanar. That is, the coil 91 and the coil 92 are arranged in a direction perpendicular to the magnetic sheet. The coil 91 and the coil 92 are concentrically disposed, and have the same number of turns. The coil L91 is adjacent to the corresponding magnetic sheet, and the coil L92 is distal from the corresponding magnetic sheet, that is, the distance between the coil L61 and the magnetic sheet M6 is closer than the distance between the coil L62 and the magnetic sheet M6. The coil L91, the capacitor C91, and the capacitor C93 resonate, while the coil L92, the capacitor C92, and the capacitor C93 resonate, so as to generate an electromagnetic field for wireless charging. In the present embodiment, the capacitances of the capacitor C91 and the capacitor C92 are set to reduce an equivalent impedance difference between the branch 91 and the branch 92, so as to reduce a difference between the current I91 passing through the branch 91 and the current I92 passing through the branch 92. Therefore, while ensuring the charging rate and the degree of charging freedom, the loss is reduced and the wireless charging efficiency is improved.

Furthermore, in the present embodiment, the capacitances of the capacitor C91, the capacitor C92 and the capacitor C93 are smaller than that in the previous embodiment. That is, in the present embodiment, the inductance difference between the coils of the parallel branches are reduced by means of partially compensating provided by the capacitor C91 and the capacitor C92, for example, when the inductance of the coil L91 adjacent to the magnetic sheet is 31 uH and the inductance of the coil L92 distal from the magnetic sheet is 28 uH, the capacitances of the capacitors C91, C92 and C93 are all set as 30 nF. The present embodiment not only realizes slightly different or basically equal currents on the parallel branches, but also satisfies a resonance relationship between the transmitting coils (L91, L92) and the compensation capacitors (C91, C92, and C93), thereby improving the wireless charging efficiency. Furthermore, in the present embodiment, the coil module adopts capacitors with small capacitances, thereby reducing circuit cost.

In other optional embodiment, the capacitances of the capacitors C91, C92, and C93 can be unequal, and can be set according to the inductances of the coils on the parallel branches, so as to achieve balance between performance of the coil module and the circuit cost. Optionally, the balance condition between the performance of the coil module and the circuit cost can be set according to a specific application scenario.

Therefore, in the present embodiment, a resonant capacitor with a corresponding capacitance is configured on the coil on each parallel branch, and a resonant capacitor is connected in series after the branches are connected in parallel. Therefore, the equivalent impedance difference between the parallel branches is reduced or eliminated, so as to reduce or eliminate the current difference between the parallel branches. The loss is reduced, the wireless charging efficiency is improved, and the manufacturing cost of the circuit is reduced, while ensuring the charging rate and the degree of charging freedom.

In another optional embodiment, the coils in the parallel branches of the coil module are wound by abreast wires, which disposed in the same plane that parallel to a corresponding magnetic sheet, wherein the coils are in parallel. During coil winding, a plurality of winding wires is wound side by side in parallel on the same plane; the positions of the wire turns of the formed coils are not completely symmetric; therefore, the inductances of the coils are still different. In the present embodiment, a resonant capacitor is respectively connected in series to each parallel branch in the coil module to reduce the equivalent impedance difference between the parallel branches, such that the currents passing through the parallel branches are equal or basically equal, reducing power consumption and improving the wireless charging efficiency. Optionally, the coils in the coil module are concentrically placed. Optionally, the coils in the coil module have the same number of turns.

Figure 10:
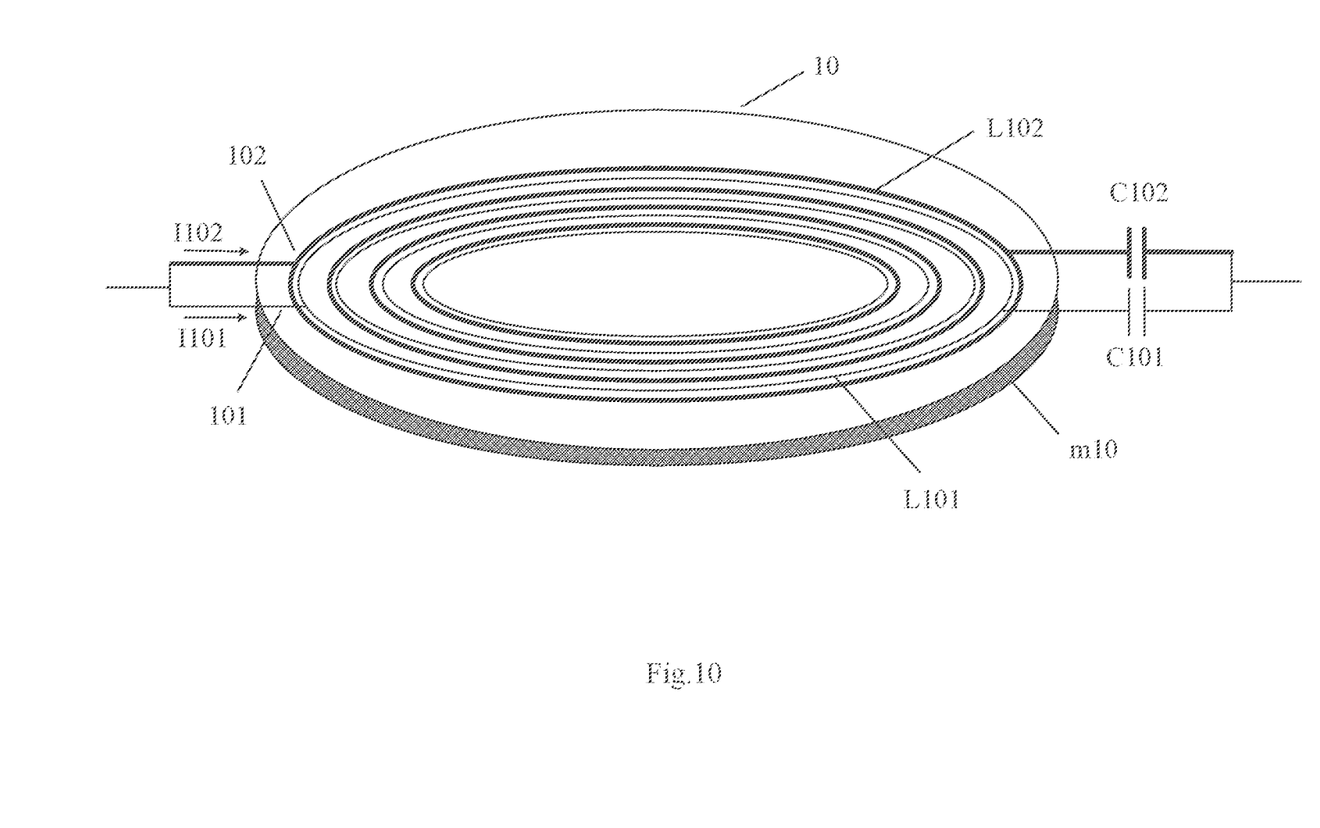
FIG. 10 is a schematic view of a coil module according to another embodiment of the present disclosure.

FIG. 10 is a schematic view of the coil module according to another embodiment of the present disclosure. The present embodiment is described by taking the following configurations as an example: the coil module includes two parallel branches, and the coils are concentrically disposed and have the same number of turns. It should be understood that the number of the parallel branches in the coil module, the positions of the coils, and the number of turns of the coils can be configured according to requirements for a specific application scenario, and are not limited by the present embodiment. As shown in FIG. 10, the coil module 10 includes a parallel branch 101 and a parallel branch 102, wherein the parallel branch 101 includes a coil L101 and a capacitor C101 which are connected series; the parallel branch 102 includes a coil L102 and a capacitor C102 which are connected in series. The coil 101 and the coil 102 are wound by abreast wires, which disposed in the same plane parallel to a corresponding magnetic sheet m10, wherein the coils are in parallel. And the coil 101 and the coil 102 are wound in the same direction. The coil 101 and the coil 102 are basically concentrically disposed, and have the same number of turns. The coil L101 resonates with the capacitor C101, and the coil L102 resonates with the capacitor C102, so as to generate an electromagnetic field for wireless charging. In the present embodiment, the capacitances of the capacitor C101 and the capacitor C102 are set to reduce or eliminate an equivalent impedance difference between the branch 101 and the branch 102, so as to reduce or eliminate a difference between the current I101 passing through the branch 101 and the current I102 passing through the branch 102, thereby reducing loss and improving the wireless charging efficiency while ensuring the charging rate and the degree of charging freedom.

In another optional embodiment, when the coils are wound in parallel by abreast wires disposed in the same plane parallel to a corresponding magnetic sheet, wherein the coils are in parallel to form the coil module, after the branches are connected in parallel, a resonant capacitor can also be connected in series with the branches. Therefore, the inductance difference between the coils of the parallel branches can be reduced by means of partially compensating provided by the capacitors in the parallel branches. The present embodiment not only realizes slightly different or basically equal currents on the parallel branches, but also satisfies a resonance relationship between the transmitting coils and the compensation capacitors, thereby improving the wireless charging efficiency. Furthermore, in the present embodiment, the coil module adopts capacitors with small capacitances to reduce circuit cost.

In one optional embodiment, the coil module further includes a magnetic sheet (for example, the magnetic sheet m6 and the magnetic sheet m10 in the above embodiment) for improving the magnetic flux of the coil. The magnetic sheet can be a soft magnetic material, such as an Ni—Zn ferrite soft magnetic sheet, an Mn—Zn ferrite soft magnetic sheet, a nano-crystalline soft magnetic sheet and the like, which is not limited by the present embodiment.

Figure 11:
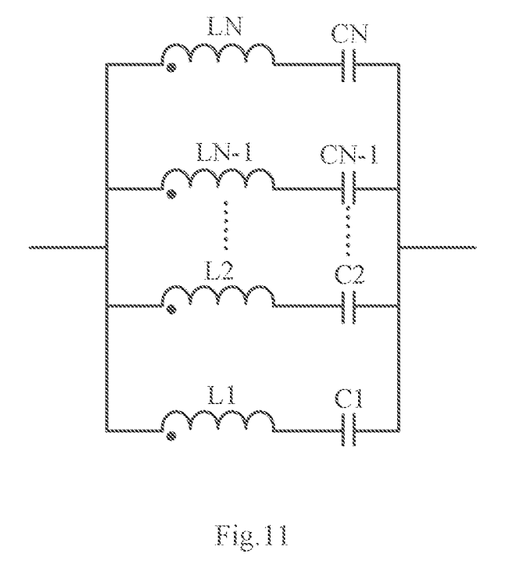
FIG. 11 is a schematic view of a circuit model of the coil module according to another embodiment of the present disclosure.

FIG. 11 is a schematic view of the circuit model of the coil module according to another embodiment of the present disclosure. In another optional embodiment, as shown in FIG. 11, the coil module 11 in the present embodiment includes N (N>1) parallel branches, wherein each parallel branch includes a coil $L_i$ and a resonant capacitor $C_i$, wherein "i" is no less than 1 and no greater than N. The capacitances of the resonant capacitors are set to reduce or eliminate an equivalent impedance difference between the parallel branches, so as to reduce or eliminate the current difference between the parallel branches, thereby reducing loss and improving the wireless charging efficiency.

In another optional embodiment, the branches in the coil module are connected in parallel and then connected in series with a resonant capacitor, so as to reduce the inductance difference between the coils of the parallel branches by means of partially compensating provided by the capacitors in the parallel branches. The present embodiment not only realizes slightly different or basically equal currents on the parallel branches, but also satisfies a resonance relationship between the transmitting coils and the compensation capacitors, thereby improving the wireless charging efficiency. Furthermore, in the present embodiment, the coil module adopts capacitors with small capacitances, thereby reducing circuit cost.

The coil module in the embodiment of the present invention includes at least two parallel branches, wherein each parallel branch includes a coil and a first capacitor which are connected in series; a capacitance of the first capacitor is set to reduce or eliminate an equivalent impedance difference between the parallel branches, so as to reduce or eliminate the current difference between the parallel branches. Therefore, the present invention can reduce loss and improve the wireless charging efficiency while ensuring the charging rate and the degree of charging freedom.

It should be understood that the number of turns of the coils in the embodiments as shown in FIGS. 6 and 10 are exemplary; in practical use, the number of turns of the coils in the coil module should be set according to the application scenario thereof, which is not limited by the present embodiment. Furthermore, the embodiments as shown in FIGS. 6 and 10 both adopt circular or elliptic coils and magnetic sheet, but the present embodiment does not limit the shape of the coils and the magnetic sheet. Other shapes, such as square shape (square or rectangle), other regular polygons or irregular shapes, can all be applied to the coils and the magnetic sheet of the present embodiment.

Figure 12:
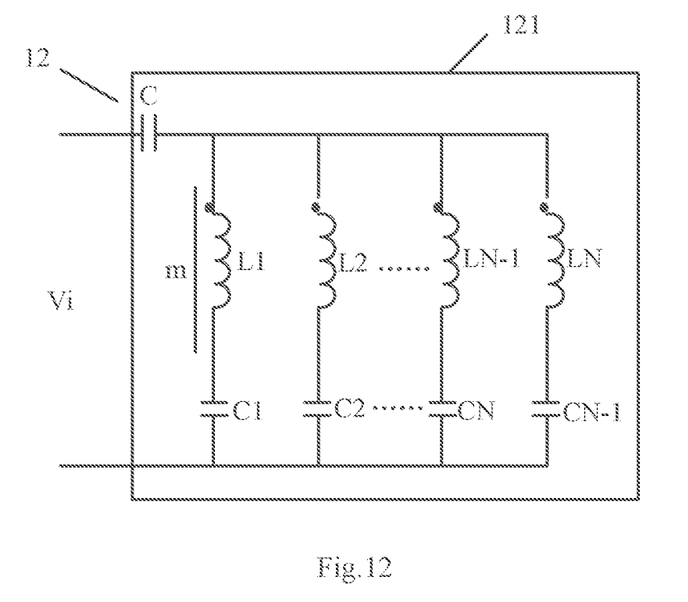
FIG. 12 is a schematic view of a power transmitting circuit according to one embodiment of the present disclosure.

FIG. 12 is a schematic view of a power transmitting circuit according to one embodiment of the present disclosure. As shown in FIG. 12, the power transmitting circuit I2 includes a coil module 121. The coil module 121 includes N parallel branches; each parallel branch includes a coil $L_i$ and a resonant capacitor $C_i$, wherein i is no less than 1 and no greater than N. The N coils can be formed by winding at least N winding wires in parallel; the N coils are wound in parallel in planes parallel to the corresponding magnetic sheet m respectively (that is, the coils are arranged in a direction perpendicular to the corresponding magnetic sheet), or are wound in parallel by abreast wires disposed in the same plane parallel to the corresponding magnetic sheet m. The capacitances of the N capacitors are set to reduce or eliminate an equivalent impedance difference between the parallel branches, so as to reduce or eliminate the current difference between the parallel branches, thereby reducing loss and improving the wireless charging efficiency while ensuring the charging rate and the degree of charging freedom.

In one optional embodiment, the coil module 121 further includes a capacitor C. N parallel branches are connected in parallel, and are then connected to the capacitor C in series; therefore, the present embodiment can reduce the inductance difference between the coils of the parallel branches by means of partial compensating provided by each capacitors $C_i$. The present embodiment not only realizes slightly different or basically equal currents on the parallel branches, but also satisfies a resonance relationship between the transmitting coils and the compensation capacitors, thereby improving the wireless charging efficiency. Furthermore, in the present embodiment, the coil module adopts capacitors with small capacitances, reducing circuit cost.

Optionally, the coil module 121 further includes a magnetic sheet m for improving the magnetic flux of the coil. The magnetic sheet can be a soft magnetic material, such as an Ni—Zn ferrite soft magnetic sheet, an Mn—Zn ferrite soft magnetic sheet, a nano-crystalline soft magnetic sheet and the like, which is not limited by the present embodiment.

The coil module of the power transmitting circuit in the embodiment of the present disclosure includes at least two parallel branches, wherein each parallel branch includes a coil and a first capacitor which are connected in series; the capacitances of the first capacitors are set to reduce or eliminate an equivalent impedance difference between the parallel branches, so as to reduce or eliminate the current difference between the parallel branches. Therefore, the loss can be reduced and the wireless charging efficiency can be improved, while ensuring the charging rate and the degree of charging freedom.

It should be understood that the coil module in the embodiment of the present disclosure can also be applied to a power receiving coil, and can also achieve the effects of reducing loss and improving the wireless charging efficiency while ensuring the charging rate and the degree of charging freedom.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is intended that the scope of the present disclosure be defined by the claims appended hereto and their equivalents.

We claim:

1. A coil module for wireless power transmitting, comprising:
   a magnetic sheet; and
   at least two parallel branches, wherein each parallel branch comprises:
   a coil; and
   a first capacitor, connected in series with the coil;

wherein the capacitance of each first capacitor is configured to reduce or eliminate an equivalent impedance difference between the parallel branches;

wherein the inductances of at least two coils are unequal;

wherein each first capacitator respectively has a constant capacitance;

wherein the parallel branches comprise a first parallel branch and a second parallel branch; and wherein the coil of the first parallel branch and the coil of the second parallel branch are wound in a same plane and are concentrically placed, the same plane of the coil of the first parallel branch and the second parallel branch being spaced apart in a perpendicular direction from the magnetic sheet and parallel to a plane of the magnetic sheet.

2. The coil module of claim 1, wherein the coils are wound in the same direction.

3. The coil module of claim 1, wherein the coils are wound by abreast wires.

4. The coil module of claim 1, wherein at least two first capacitors have the same capacitance.

5. The coil module of claim 1, wherein the capacitances of the first capacitors are configured to cause the equality of equivalent impedances of the parallel branches.

6. The coil module of claim 1, further comprising:
a second capacitor;
wherein the parallel branches connected in parallel are connected to the second capacitor in series.

7. The coil module of claim 1, wherein the coils are concentrically placed.

8. The coil module of claim 1, wherein the coils have the same number of turns.

9. The coil module of claim 1, further comprising:
a magnetic sheet.

10. A power transmitting circuit, used for transmitting power in a wireless manner, wherein the power transmitting circuit comprises:
a coil module, comprising:
a magnetic sheet; and
at least two parallel branches, wherein each parallel branch comprises:
a coil; and
a first capacitor, connected in series with the coil;
wherein the capacitance of each first capacitor is set to reduce or eliminate an equivalent impedance difference between the parallel branches;
wherein the inductances of at least two coils are unequal;
wherein each first capacitator respectively has a constant capacitance;
wherein the parallel branches comprise a first parallel branch and a second parallel branch; and
wherein the coil of the first parallel branch and the coil of the second parallel branch are wound in a same plane and are concentrically placed, the same plane of the coil of the first parallel branch and the second parallel branch being spaced apart in a perpendicular direction from the magnetic sheet and parallel to a plane of the magnetic sheet.

11. A power receiving circuit, used for receiving power in a wireless manner, wherein the power receiving circuit comprises:
a coil module, comprising:
a magnetic sheet; and
at least two parallel branches, wherein each parallel branch comprises:
a coil; and
a first capacitor, connected in series with the coil;
wherein the capacitance of each first capacitor is set to reduce or eliminate an equivalent impedance difference between the parallel branches;
wherein the inductances of at least two coils are unequal;
wherein each first capacitator respectively has a constant capacitance;
wherein the parallel branches comprise a first parallel branch and a second parallel branch; and
wherein the coil of the first parallel branch and the coil of the second parallel branch are wound in a same plane and are concentrically placed, the same plane of the coil of the first parallel branch and the second parallel branch being spaced apart in a perpendicular direction from the magnetic sheet and parallel to a plane of the magnetic sheet.

12. The coil module of claim 1, wherein the capacitances of the first capacitors of at least two parallel branches are unequal.

* * * * *